United States Patent [19]

Wang et al.

[11] 4,216,970
[45] Aug. 12, 1980

[54] VIDEO DISC LUBRICANTS

[75] Inventors: Chih C. Wang, Hightstown; Lincoln Ekstrom, Princeton, both of N.J.; Henry Wielicki, Wyndmoor, Pa.

[73] Assignee: RCA Corporation, New York, N.Y.

[21] Appl. No.: 17,099

[22] Filed: Mar. 5, 1979

[51] Int. Cl.² .......................... A63G 1/34; G11B 5/00; B32B 3/02
[52] U.S. Cl. ........................... 274/42 R; 179/100.1 B; 428/64; 428/65; 428/447
[58] Field of Search ................. 428/323, 64, 408, 451, 428/447, 450, 403, 65; 358/128 B; 179/100.1 B; 274/42 R

[56] References Cited

U.S. PATENT DOCUMENTS

| 3,833,408 | 9/1974 | Matthies | 179/100.2 A X |
| 3,842,194 | 10/1974 | Clemens | 179/100.1 B |
| 3,842,217 | 10/1974 | Clemens | 179/100.4 C |
| 3,843,399 | 10/1974 | Kaplan et al. | 358/128 |
| 3,909,517 | 9/1975 | Clemens | 178/6.6 A |

OTHER PUBLICATIONS

Eaborn, Organosilicon Cpds., 1960, pp. 51–52, 60, 228 and p. 235.

*Primary Examiner*—William R. Dixon, Jr.
*Attorney, Agent, or Firm*—Birgit E. Morris

[57] ABSTRACT

Siloxanes of the formula

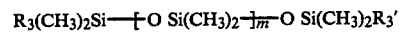

$$R_3(CH_3)_2Si-[O\ Si(CH_3)_2]_m-O\ Si(CH_3)_2R_3'$$

wherein $R_3$ and $R_3'$ independently at each occurrence are long chain alkyl groups and m is an integer of 0 or 1, can be employed as lubricants for video discs. The lubricants are stable to long term storage and to wide variations in temperature and humidity.

8 Claims, No Drawings

VIDEO DISC LUBRICANTS

This invention relates to a novel lubricant for video discs. More particularly, this invention relates to the use of particular polysiloxanes as video disc lubricants.

BACKGROUND OF THE INVENTION

Clemens, in U.S. Pat. Nos. 3,842,194, 3,842,217 and 3,909,517, has described a conductive video disc comprising a molded plastic disc having audio, video and color information in the form of geometric variations in a spiral groove in the disc surface. These discs were then coated first with a conductive material such as a metal layer which acts as a first electrode, and then with a dielectric layer, such as an inert polymer layer. A metal tipped stylus acts as a second electrode of a capacitor and the information signals are monitored by the stylus which notes changes in capacitance between the stylus and the disc surface as the information, in the form of depressions, passes beneath the stylus when relative motion is established between the disc and the stylus.

In order to prevent undue wear between the disc and the stylus, a lubricant layer was also applied to the disc surface by evaporation. Suitable lubricants were found to be compounds of the formula

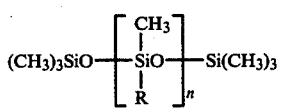

wherein R is an alkyl group of 4–20 carbon atoms and n is an integer, as disclosed by Matthies in U.S. Pat. No. 3,833,408.

Further developments in this system have produced a video disc which is made of a conductive plastic material, e.g., a polyvinylchloride polymer resin containing sufficient amounts of conductive particles, such as conductive carbon particles, so that the disc can provide capacitance readout. The carbon particles are surrounded by organic materials such as the plastic resin and various processing additives which provide a dielectric surface layer on the conductive particles. This development has eliminated the need for separate coatings of metal and dielectric on the plastic disc, and thus has greatly improved the economics of the system. In other developments, video discs which do not require a grooved surface are also under development. The stylus is maintained in synchronization with the information pattern by means of electrical signals on either side of the information track, rather than physically by means of the groove walls.

The stylus, formerly made of metallized sapphire, has also been improved so that metallized diamond can be employed. Diamond is a harder, longer wearing material than sapphire and is thus preferred. However, a diamond stylus also requires good lubrication of the disc surface.

These changes in materials led to the need for a modification of the lubricant whereby lubricants included in the general formula above, but limited as to molecular weight and purity, were needed. Copending application of Wang et al, Ser. No. 937,819, filed Aug. 29, 1978, discloses the use of methylalkylsiloxanes of the formula

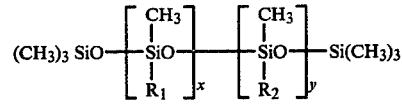

wherein $R_1$ and $R_2$ are alkyl groups of 4–20 carbon atoms, x is an integer of 2–4 and y is an integer of 0–2 and wherein the sum of x and y is 4 or less, as improved video disc lubricants for conductive carbon loaded video discs. The modified methylalkylsiloxanes can be readily applied to the video disc, as by spraying which is the preferred application method, and give improved results as lubricants. However, these materials have the disadvantage that they are rather expensive to prepare, requiring several processing steps including molecular distillation under high vacuum conditions, also entailing the need for expensive equipment. Thus it would be desirable to obtain another lubricant that can meet the stringent requirements for the video disc and be simpler and less expensive to manufacture.

SUMMARY OF THE INVENTION

We have found that liquid polysiloxanes of the formula

wherein m can be 0 or 1 and $R_3$ and $R_3'$ independently at each occurrence are long chain alkyl groups, preferably of 10–14 carbon atoms, can be employed as video disc lubricants.

DETAILED DESCRIPTION OF THE INVENTION

In order to be useful as a video disc lubricant, a suitable material, in addition to imparting good lubricity between the disc and stylus surfaces, must have proper surface tension, adhesion to the disc surface, cohesion and elasto hydrodynamic properties so as to form a uniform thin film which will support the stylus at a constant height above the signal elements during playback. In addition the lubricant must be stable against degradation due to wear caused by repeated playbacks, must resist evaporation or oxidation and must be chemically inert with respect to the material of the video disc itself and to the atmosphere. Further it must be able to be applied readily as by spraying from a solvent solution, or by evaporation and the like.

The present polysiloxanes having terminal long chain alkyl groups fulfill all of these requirements. However, if the terminal alkyl group is too small, e.g., below about $C_{10}$, the lubricants exhibit inferior lubricating qualities and/or environmental instabilities. When the terminal alkyl group is too large, e.g., above about $C_{14}$, the lubricants become semi-solids or wax-like materials which will not form a continuous film on the disc surface. Higher molecular weight compounds, particularly when m in the above formula is 1, that are not liquids are not suitable for the present application. However, mixtures of the above compounds can be employed. By liquid, we mean that the lubricant does not solidify at temperatures of about 60° F.

The siloxanes of the present invention belong to a group of known materials and can be prepared according to methods described in C. Eaborn, Organosilicon Compounds, Butterworths Scientific Publications, London, 1960. According to one process, a $C_{10}$ to $C_{14}$ alkene is first reacted with dimethyl silane hydrochloride in the presence of a chloroplatinic acid catalyst to form an alkylated dimethyl silicon chloride which is then hydrolyzed to the corresponding siloxane. The reactions can be summarized by the following equations:

$$C_{12}H_{24} + (CH_3)_2SiHCl \xrightarrow{H_2PtCl_6} C_{12}H_{25}(CH_3)_2SiCl \quad (1)$$

$$2\ C_{12}H_{25}(CH_3)_2SiCl + H_2O \quad (2)$$

$$\downarrow \qquad\qquad\qquad \uparrow$$

$$C_{12}H_{25}(CH_3)_2Si\text{—}O\text{—}Si(CH_3)_2C_{12}H_{25} + 2HCl \uparrow$$

The siloxanes described above can be dissolved in a suitable solvent, such as heptane or other solvent which is inert with respect to the disc surface. Typically the solution contains from about 0.2 to 2.0 percent by weight of the siloxane. The solution can then be sprayed onto the disc surface to form a siloxane film about 200–300 angstroms thick. Any suitable method of applying a film about 150–500 angstroms thick can be employed.

The present siloxanes are particularly suitable for application to conductive carbon loaded video discs as described by Fox and Datta in copending application Ser. No. 818,279, filed July 25, 1977 and by Ryan et al in copending application Ser. No. 003,363, filed Jan. 15, 1979, both herein incorporated by reference.

The present siloxane lubricants do not degrade with time, are stable with respect to atmospheric effects and provide high uniformity and reproducibility on the video disc. In addition, the siloxanes provide excellent lubrication as measured by low stylus and disc wear and excellent initial playback.

The invention will be further illustrated by the following Example but the invention is not meant to be limited to the details described therein. In the Example percent is by weight unless otherwise noted.

EXAMPLE

A siloxane of the formula $$C_{12}H_{25}\text{—}\underset{\underset{CH_3}{|}}{\overset{\overset{CH_3}{|}}{Si}}\text{—}O\text{—}\underset{\underset{CH_3}{|}}{\overset{\overset{CH_3}{|}}{Si}}\text{—}C_{12}H_{25}$$

was dissolved in heptane so as to form a 0.3 percent solution and sprayed onto a series of video discs. The thickness of the lubricant film after evaporation of the solvent was about 200 angstroms. The quality of the video discs during playback was measured by determining the carrier distress time, which is measured by adding the amount of time, (but discounting intervals of less than 10 microseconds) during total disc playback when the R.F. output of the player arm is less than 50 millivolts peak to peak, and the time when the R.F. output is above 8.6 megahertz or below 3.1 megahertz in frequency, indicating a defect. Such defects are noted by the viewer as dropouts. The pass criterion for a video disc is a maximum of 3 seconds of carrier distress for playback of one side of a record, which usually takes about 60 minutes, and good video quality is considered to be less than 1.0 second of carrier distress per side of playback.

Over 90 percent of the discs tested as above had less than 1.0 second distress time during playback of one side of the disc.

Stylus and disc surface wear tests were made on the above discs by playing the same 20 minute band for 13 hours, measuring the stylus wear and examining the disc surfaces before and after the tests for gross, visible wear and significant surface damage visible to the eye and/or under a microscope.

The stylus wear rate for the above discs was less than 0.01 micron$^3$/hour. This corresponds to a stylus life of 200 hours or higher of playback. None of the discs showed gross wear or significant surface damage.

The effect of low humidity on the lubricant as above was tested by measuring the carrier distress time of 12 of the discs under ambient conditions, i.e., 76° F. and 18 percent relative humidity, hereinafter RH, and then storing the discs at 70° F. and 7 percent RH for 72 hours. The carrier distress time was measured before and after storage. All of the discs played well and no degradation after low humidity storage was noted.

The effect of high temperature, high humidity and moisture condensation distress on the above lubricant was tested by measuring the carrier distress times of 12 video discs coated with the above lubricant, storing them under ambient conditions (70° F. and 20 percent RH) and immediately placing them in a chamber at 95° F. and 75 percent RH and storing for 2 hours. The carrier distress time results are summarized below:

|  | Carrier Distress Time, sec./play | | |
|---|---|---|---|
|  | % ≦ 0.5 sec. | % ≦ 1.0 sec. | % ≦ 3.0 sec. |
| Pre-stress playback | 58.3 | 83.3 | 83.3 |
| Post-stress playback | 66.7 | 83.3 | 100 |

These results are compared with the prior art lubricated video discs, wherein carrier distress times are given below:

|  | Carrier Distress Time, sec./play | | |
|---|---|---|---|
|  | % ± 0.5 sec. | % ± 1.0 sec. | % ± 3.0 sec. |
| Pre-stress playback | 50.0 | 75.0 | 91.6 |
| Post-stress playback | 58.3 | 66.7 | 83.3 |

We claim:

1. In a video disc information record, adapted for use with a playback stylus to effect recovery of signals occupying a bandwidth of at least several megahertz when relative motion at a desired rate is established between said record and said stylus, said record comprising a disc of a conductive material containing an information track constituted by a surface relief pattern in said track to accommodate recovery of signals of said bandwidth upon establishment of relative motion at said rate, said record coated with a siloxane lubricant coating from about 150 to 500 angstroms thick, the improvement which comprises utilizing as said lubricant a liquid composition of the formula

wherein $R_3$ and $R_3'$ independently at each occurrence are long chain alkyl groups of 10–14 carbon atoms and m is an integer of 0 or 1.

2. A record according to claim 1 wherein m is 0.

3. A record according to claim 2 wherein $R_3$ and $R_3'$ are the same and are alkyl groups of 10–14 carbon atoms.

4. A record according to claim 3 wherein $R_3$ and $R_3'$ are dodecyl groups.

5. In a recording means comprising a disc having an information track in a surface thereof, said information track containing information in the form of geometric variations in the surface of said disc, and a uniform lubricant layer from about 150 to 500 angstroms thick disposed on the surface of said disc, the improvement which comprises utilizing as said lubricant a liquid composition of the formula

wherein $R_3$ and $R_3'$ independently at each occurrence are long chain alkyl groups of 10–14 carbon atoms and m is an integer of 0 or 1.

6. A recording means according to claim 5 wherein said disc is a conductive disc.

7. In an information record adapted for use with a playback stylus to effect recovery of signals when relative motion at a desired rate is established between said record and said stylus and containing an information track constituted by a surface relief pattern in said track to accommodate recovery of said signals during playback, said record being coated with a lubricant coating from about 150 to 500 angstroms thick, the improvement which comprises utilizing as said lubricant coating a liquid composition of the formula

wherein $R_3$ and $R_3'$ independently at each occurrence are long chain alkyl groups of 10–14 carbon atoms and m is an integer of 0 or 1.

8. A record according to claim 7 wherein said record is a conductive disc.

* * * * *